United States Patent
Moeller et al.

(10) Patent No.: US 9,784,239 B2
(45) Date of Patent: Oct. 10, 2017

(54) ARRANGEMENT TO ALIGN A PART OF A WIND TURBINE

(71) Applicant: SIEMENS AKTIENGESELLSCHAFT, München (DE)

(72) Inventors: Jesper Moeller, Brande (DK); Jacob Groenvald Nielsen, Aarhus V (DK)

(73) Assignee: Siemens Aktiengesellschaft (DE)

( * ) Notice: Subject to any disclaimer, the term of this patent is extended or adjusted under 35 U.S.C. 154(b) by 147 days.

(21) Appl. No.: 14/788,832

(22) Filed: Jul. 1, 2015

(65) Prior Publication Data

US 2016/0084221 A1 Mar. 24, 2016

(30) Foreign Application Priority Data

Sep. 22, 2014 (EP) .................................. 14185847

(51) Int. Cl.
  *F03D 1/00* (2006.01)
  *B23P 19/10* (2006.01)
  (Continued)

(52) U.S. Cl.
  CPC ............. *F03D 1/001* (2013.01); *B23P 19/10* (2013.01); *F03D 13/10* (2016.05); *F03D 13/20* (2016.05); *F05B 2230/604* (2013.01); *F05B 2240/912* (2013.01); *Y02E 10/728* (2013.01); *Y02P 70/523* (2015.11)

(58) Field of Classification Search
  CPC .......... F03D 1/001; F03D 13/20; B23P 19/10; Y02P 70/523; Y02E 10/728; F05B 2240/912; F05B 2230/604
  See application file for complete search history.

(56) References Cited

U.S. PATENT DOCUMENTS

| 2011/0283640 A1* | 11/2011 | Miller ..................... E02D 27/42 52/292 |
| 2013/0312241 A1 | 11/2013 | Jensen |
| 2014/0237932 A1 | 8/2014 | Moestrup et al. |

FOREIGN PATENT DOCUMENTS

| CN | 203335331 U | 12/2013 |
| EP | 2538000 A2 | 12/2012 |

(Continued)

OTHER PUBLICATIONS

European Extended Search Report; Application No. 14185847.2; 6 pgs.

*Primary Examiner* — John C Hong
(74) *Attorney, Agent, or Firm* — Schmeiser Olsen & Watts LLP

(57) ABSTRACT

An arrangement and a method to align a part of a wind turbine to a counterpart is provided. The part of the wind turbine and its counterpart are approached in a main direction of approach, to be connected. The arrangement includes a first and a second alignment tool, whereby the alignment tools include a first area to be connected to the part of the wind turbine, and a second area that protrudes over the physical dimensions of the part of the wind turbine mainly in the main direction of approach. The second area is arranged and prepared in a way to abut on the counterpart, in a direction perpendicular to the main direction of approach, as an arrester to stop and/or hinder a movement of the part of the wind turbine in respect to the counterpart during the alignment.

16 Claims, 11 Drawing Sheets

(51) Int. Cl.
*F03D 13/20* (2016.01)
*F03D 13/10* (2016.01)

(56) References Cited

FOREIGN PATENT DOCUMENTS

| | | |
|---|---|---|
| EP | 2667017 A1 | 11/2013 |
| JP | 2014001595 A | 1/2014 |
| WO | WO2011009538 A2 | 1/2011 |
| WO | WO 2013027048 A1 | 2/2013 |
| WO | WO 2014075686 A1 | 5/2014 |
| WO | WO 2014075687 A1 | 5/2014 |
| WO | WO 2014142558 A1 | 9/2014 |

* cited by examiner

ARRANGEMENT TO ALIGN A PART OF A WIND TURBINE

CROSS-REFERENCE TO RELATED APPLICATIONS

This application claims priority EP 14185847.2, having a filing date of Sep. 22, 2014, the entire contents of which are hereby incorporated by reference.

FIELD OF TECHNOLOGY

The following relates to an arrangement and a method to align a part of a wind turbine to a counterpart.

BACKGROUND

Towers, such as wind turbine towers for example, are made of steel or concrete. The tower is manufactured in a manufacturing site and transported to the installation site. There the tower is erected and connected to a foundation.

The tower can be manufactured in one piece, or it can comprise several segments. In the case of tower segments, the segments are transported to the installation site and are connected at the installation site.

The tower segments can be connected before the tower is erected and connected to the foundation. It is also possible to connect the lowest tower segment to the foundation. Additional tower segments are attached to the first segment after the first segment is connected to the foundation.

The tower segments are fixed to the foundation or to another tower segments by a bolted flange connection, for example.

During the installation of the tower or the tower segments, the connection interface between parts of the tower or between a part of the tower and the foundation need to be aligned.

It is known to use guiding means to assist in aligning the parts of the tower.

JP 2014001595 A discloses an assembly of a concrete column, which is with an upper pillar made from pre-stressed concrete having a tapered surface, and a lower column having a tapered surface. A tapered guiding means is used for coupling the columns. The guiding means for couplings is inserted over the tapered surface of a lower column from the upper pillar.

The guiding means can only be used at tapered tower walls.

CN 203335331 U describes a guiding means for aligning a tower cylinder with a flange with bolt holes. The guiding means have a pin rod and pin cap, whereby one end of pin rod is cone-shaped. The other end is welded to a pin cap. The diameter of the pin is the same as the diameter of a bolt for the flange of the wind turbine tower cylinder. The guiding means use a bolt hole in the flange.

EP 2667017 A describes an aligning tool in the field of wind turbines for aligning a hole with a fastener. The first section is adapted for connecting to the fastener and the second section having an outside diameter tapering down in a direction away from the first section. The aligning tool is connected to the fastener and can easily catch a corresponding hole.

The installation of a tower or tower segment with the guiding means described is carried out with the assistance of personnel. Thus humans are present in the area of the tower where the tower segments are connected. The workers assist in aligning the tower with the help of ropes, by hand or just by visually controlling the process. This shows the disadvantage of injuries, as the tower segments are heavy and the movement of the tower segment is influenced by wind and thus not completely controllable.

WO 2011/009538 A2 discloses a system for assembling, for fixing and for transporting as well as a method for assembling and for transporting components of a wind turbine. A connecting device, a transport beam, and transport frame are provided. The invention addresses the problem of providing a system and a method with which a rapid, cost-effective and reliable transport and a rapid, cost-effective and reliable assembly and disassembly of the components of a wind turbine can be achieved. That problem is essentially solved in that the connecting device comprises two corresponding elements, which provide guide elements and receiving elements, the result being that the components are rapidly and reliably joined.

To align a component of a wind turbine with the arrangement and method described in the prior art document, the component of the wind turbine already needs to be aligned to a high degree to its counterpart. If the alignment is out of a predetermined range the alignment arrangement can't interact and align the component.

SUMMARY

An aspect relates to an improved guiding means and a method to align a tower.

An arrangement to align a part of a wind turbine to a counterpart is disclosed, whereby the part of the wind turbine and its counterpart are approached in a main direction of approach, to be connected.

The arrangement comprises a first and a second alignment tool, whereby the alignment tools comprise a first area to be connected to the part of the wind turbine, and a second area that protrudes over the physical dimensions of the part of the wind turbine mainly in the main direction of approach.

The second area is arranged and prepared in a way to abut on the counterpart, in a direction perpendicular to the main direction of approach, as an arrester to stop and/or hinder a movement of the part of the wind turbine in respect to the counterpart during the alignment.

The first alignment tool stops and/or hinders a movement in a first direction, so that the position of the part of the wind turbine in respect to the counterpart is fixed in a first direction.

The second alignment tool stops and/or hinders a movement in a second direction, so that the position of the part of the wind turbine in respect to the counterpart is fixed in a second direction.

The arrangement comprises at least one guide pin unit that interacts with a hole in the counterpart, to arrest the rotational position of the part of the wind turbine in respect to the counterpart, after the rotational position of the part of the wind turbine was aligned to the counterpart.

The part of the wind turbine might be a wind turbine tower or a wind turbine tower segment, or a nacelle, and the counterpart is a transition piece or a wind turbine tower segment, for example. The alignment tool can also be used to connect a rotor blade to a hub.

The parts of the wind turbine are big in size and are therefore transported to the installation site of the wind turbine separately. The parts of the wind turbine are then connected to form the wind turbine.

An installation situation at a wind turbine can be, for example, that a segment of a tower is planned to be connected to a transition piece, or a nacelle is going to be connected to a tower. The tower segment or the nacelle would then be lifted by a crane to be lowered to the transition piece or the tower, in order to connect the parts.

The tower segment or the nacelle needs to be precisely positioned in order to be connected. The part of the wind turbine is connected to the crane by a rope and might experience a certain movement due to wind or the crane's movement.

The movement needs to be eliminated to align and connect the part of the wind turbine to the counterpart.

During the installation, and in order to connect the part of the wind turbine to the counterpart, the part of the wind turbine is brought closer to the counterpart.

During the installation of a wind turbine a part of the wind turbine is aligned to its counterpart, to be connected to the counterpart in a predetermined position. To align and connect the part of the wind turbine to the counterpart, the part of the wind turbine is approached to the counterpart in the direction the connection will be established. The main direction of the approach within the last few meters of distance defines a main direction of approach of the part of the wind turbine to the counterpart.

For example, in the case to the installation of a nacelle to the tower, the nacelle is lifted by a crane, to be then lowered on the top of the tower. Within the last few meters of distance between the nacelle and the tower, the nacelle is lowered in a mainly vertical direction towards the top of the tower. The main direction of approach is then the mainly vertical downward direction.

An arrangement is described to be used for the alignment of the part of the wind turbine to its counterpart. The arrangement comprises a first and a second alignment tool that are connected to the part of the wind turbine.

The alignment tools are connected to the part of the wind turbine for the installation of the wind turbine and can be removed after the part of the wind turbine is aligned and connected to its counterpart and the alignment tool is no longer needed. The alignment tool can then be used again in another alignment situation.

Each alignment tool is connected to the part of the wind turbine with a first area, whereby a part of the alignment tool protrudes over the physical dimensions of the part of the wind turbine.

The physical dimensions of the part of the wind turbine are defined by the length the width and the height of the part, and are limited by the outer boundary of the part of the wind turbine.

This means that the alignment tool stands out or projects over the rim of the part of the wind turbine.

The first and the second alignment tool project from the part of the wind turbine mainly in the same direction, namely in the direction towards the counterpart.

The part of the alignment tool that protrudes over the part of the wind turbine comprises a second area that is provided to abut to the counterpart of the part of the wind turbine. This means that it is planned to come in direct contact to the counterpart during the alignment of the part of the wind turbine and the counterpart. The second area of the alignment tool is located mainly at a side of the alignment tool, so that the alignment tool abuts on the counterpart in a lateral movement.

A lateral movement is a movement that is mainly perpendicular to the main direction of approach. In the case of the installation of a nacelle to a tower, the main direction of approach is a mainly vertical downward direction. A lateral direction is perpendicular to the main direction of approach and is in this case a mainly horizontal direction.

The alignment tool is an arrester or stopper to stop and/or hinder a lateral movement of the part of the wind turbine in one direction, which is a lateral direction.

The first alignment tool stops or hinders a lateral movement in a first direction, and the second alignment tool stops or hinders a lateral movement of the part of the wind turbine in respect to the counterpart in a second direction.

The movement in the first or the second direction is a mainly linear movement in the direction, the alignment tool still allow a rotational movement of the part of the wind turbine.

Thus the pendular movement of the part of the wind turbine relative to its counterpart is eliminated.

For example the part of the wind turbine and the counterpart comprise a flange to be connected to form a flange connection. The first and the second alignment tool abut with their second area on the inner rim of the flange of the counterpart. Thus a lateral movement of the part of the wind turbine and the counterpart is mainly eliminated. A flange connection is fixed by bolts that are arranged in bolt holes. Therefore the bolt holes need to be aligned, too. A rotational movement of the part of the wind turbine in respect to the counterpart is still possible. Thus the rotational position of the part of the wind turbine can be adjusted, to align the bolt holes of the flanges.

The rotational movement of the part of the wind turbine in respect to the counterpart is performed around the middle axis of the flange connection, thus an axis vertical to the connection plane of the flanges.

The described arrangement allows a rotational movement of the part of the wind turbine in respect to the counterpart after the alignment tool abutted on the counterpart.

The arrangement comprises a guide pin that interacts with a hole in the counterpart.

The guide pin is attached to the part of the wind turbine.

In the example of a flange connection the guide pin can be arranged in a hole of the flange of the part of the wind turbine.

The part of the wind turbine is rotated in respect to the counterpart until a predetermined position is reached. This can be, for example, that the respective holes of the flanges are aligned. The part of the wind turbine is then moved even closer to the counterpart and the guide pin interacts with the hole of the counterpart and fixes the rotational position of the part of the wind turbine. For example, the guide pin is introduced into the hole of the counterpart.

Thus, the part of the wind turbine is fully aligned to the counterpart, and the part of the wind turbine can be connected to the counterpart.

Thus, the alignment of the parts is supported by the arrangement. Thus the alignment can be performed safer and quicker. Thus installation time is saved, and thus installation costs are reduced.

In addition, no direct human interference with the part of the wind turbine is necessary to align it with its counterpart. Thus the installation is safer for the workers.

In addition, the installation of the wind turbine can be performed in weather situations with higher wind speeds than it was possible before.

Preferably, the second area of the alignment tools comprises an elastic part, to avoid a damage of the counterpart when the second area abuts on the counterpart.

The elastic part can be an elastic or soft cover, or surface of the alignment tool. The elastic material can be rubber or a plastic material, for example, or wood.

The alignment tool can also be equipped with an elastic element like a spring to allow the part of the alignment tool, that comprises the second area, to yield.

Thus, the second area can give way when it abuts on the counterpart. Thus damage at the alignment tool and/or the counterpart is reduced.

Preferably, the alignment tool comprises a base and an arm, and that the base comprises the first area and the arm comprises the second area.

The alignment tool comprises a base that is connected to the part of the wind turbine, and an arm the partially protrudes over the physical dimensions of the part of the wind turbine. Thus the base comprises the first area and the arm comprises the second area. The two parts are connectable and are adjustable in their position in respect to each other.

Thus, the alignment tool can be adjusted to suit to different parts of the wind turbine.

Thus, the alignment tool can be used for different parts of a wind turbine to be connected, and can be re-used at a wider range of parts and products.

Preferably, the arm is connected to the base by a connection that withstands forces that act on the arm up to a certain predetermined value, and allows the arm to yield, when the predetermined force is exceeded.

A force is acting on the arm of the alignment tool, when the second area abuts on the counterpart. The force can vary.

The connection between the base and the arm is established in a way that the arm can give way or yield when the forces are too strong.

This can be done by connecting the arm by a connection pin or a bolt, and a shear pin. In the case of a force exceeding a certain predetermined limit the shear pin will break and the arm can pivot around the connection pin.

Thus, the alignment tool is protected from damage due to high force.

The alignment tool is connected to a part of the wind turbine. Thus forces can be transferred to the part of the wind turbine, and the part of the wind turbine can suffer damages too.

Thus the part of the wind turbine is protected from suffering damages due to high forces acting on the alignment tool.

Preferably the second area of the alignment tool comprises a section that is inclined in respect to the main direction of approach to facilitate the alignment of the part of the wind turbine in respect to the counterpart.

The second area comprises an inclined section. The section can cover between 10 and 100% of the area.

The section is inclined in respect to the main direction of approach. This makes it easier and safer to approach the alignment tool and to abut on the surface of the counterpart.

Thus, the installation and alignment can be facilitated, and the risk of damage is reduced.

Preferably, the first alignment tool projects further over the physical dimensions of the part of the wind turbine than the second alignment tool, so that the first alignment tool abuts on the counterpart before the second alignment tool, when the part of the wind turbine is approached to the counterpart.

Thus, the part of the wind turbine can be placed in a certain distance to the counterpart, that allows only the first alignment tool to abut on the counterpart. Then the distance between the part of the wind turbine and the counterpart can be further reduced, to allow also the second alignment tool to abut on the surface of the counterpart.

Thus, a higher level of control over the process of the alignment is possible. Thus the danger of failures or damages is even reduced.

Preferably, the guide pin unit comprises a guide pin, and the guide pin comprises a longitudinal axis that is mainly parallel to the main direction of approach, and that the guide pin yields in the direction of the longitudinal axis, and is rigid in a direction perpendicular to the longitudinal axis.

The guide pin can be resilient in the direction of its longitudinal axis and rigid in the directions perpendicular to the longitudinal axis.

A spring can be used to allow the guide pin to give way when a force is acting on the guide pin mainly in the direction of the longitudinal axis.

This avoids damage to the guide pin due to a possible misalignment of the holes.

Preferably, at least one of the alignment tools and/or the guide pin unit is detachably attached to the part of the wind turbine.

Thus, the alignment too can be detached from the part of the wind turbine and be reused at a different installation.

Thus, material and production costs for additional tools are saved.

Preferably, the alignment tool is connected to a flange of the part of the wind turbine by a pin that is introduced in a hole of the flange and a clamp acting on the part of the wind turbine.

A clamp can also be a fastener or a clip.

Thus, the alignment tool can be securely attached to the part of the wind turbine without the need of additional holes in the part of the wind turbine or connection arrangement attached to the part.

Preferably, the second area of the alignment tool comprises a spherical element that abuts on the counterpart so that it rolls along the surface of the counterpart during a movement of the part of the wind turbine in respect to the counterpart, to facilitate the movement and avoid a damage at the counterpart.

A ball element is arranged at the second area of the alignment tool, to form a part of the second area. The ball element is in contact to the surface of the counterpart, when the second area abuts on the counterpart. The ball can rotate, and thus can roll along the surface of the counterpart during a movement of the part of the wind turbine in respect to the counterpart.

Thus, the sliding friction between the surface of the second area and the surface of the counterpart is reduced. Thus scratches and wear at the surfaces are reduced.

Preferably, a sensor unit is arranged at the counterpart, to detect the presence of the guide pin in a hole of the counterpart.

Thus, the successful alignment of the part of the wind turbine and the counterpart can be automatically detected. Thus no direct visual control of the alignment situation of a worker is necessary. Thus the worker can monitor the alignment form the distance, and can stay in a safe environment.

Preferably, an optical sensor is arranged at the counterpart to trace the rotational position of the part of the wind turbine in respect to the counterpart.

A flange connection comprises a plurality of holes. During the installation of the part of the wind turbine a certain hole of the part needs to be aligned to a certain other hole in the counterpart.

Thus, the alignment of the respective holes can be detected automatically. Thus no direct visual control of a worker is necessary. Thus the worker can monitor the alignment form the distance, and can stay in a safe environment.

Preferably, the optical sensor comprises an optical transmitter and an optical receiver to send and receive optical information.

Thus, the optical sensor can send and receive optical information to detect the presence of the respective hole over the sensor.

Preferably, a reflective element is attached to the part of the wind turbine to interact with the optical sensor that is attached to the counterpart, and to facilitate to trace the rotational position of the part of the wind turbine.

The optical transmitter of the optical sensor sends light through a certain hole of the counterpart. A certain hole in the part of the wind turbine is equipped with a reflective element. When the hole with the reflective element is above the hole with the optical sensor, the light of the transmitter is reflected at the reflective element and is returned to the receiver.

Thus, the respective hole of the part of the wind turbine can be identified.

Thus, the rotational position of the part of the wind turbine in respect to the counterpart can be detected, and a certain position and be identified.

A method to align a part of a wind turbine to a counterpart is disclosed, by using an arrangement, whereby the part of the wind turbine and its counterpart are approached in a main direction of approach, to be connected.

The arrangement comprises a first and a second alignment tool, whereby the alignment tools comprise a first area to be connected to the part of the wind turbine, and a second area that protrudes over the physical dimensions of the part of the wind turbine mainly in the main direction of approach.

The second area is arranged and prepared in a way to abut on the counterpart, in a direction perpendicular to the main direction of approach, as an arrester to stop and/or hinder a movement of the part of the wind turbine in respect to the counterpart during the alignment.

The first alignment tool stops and/or hinders a movement in a first direction, so that the position of the part of the wind turbine in respect to the counterpart is fixed in a first direction.

The second alignment tool stops and/or hinders a movement in a second direction, so that the position of the part of the wind turbine in respect to the counterpart is fixed in a second direction.

The arrangement comprises at least one guide pin unit that interacts with a hole in the counterpart, to arrest the rotational position of the part of the wind turbine in respect to the counterpart, after the rotational position of the part of the wind turbine was aligned to the counterpart.

The method comprises the steps of abutting the first alignment tool to the counterpart by performing a lateral movement in a first direction, and abutting the second alignment tool to the counterpart by performing a lateral movement in a second direction.

The method comprises the further steps of rotating the part of the wind turbine in respect to the counterpart to reach a predetermined rotational position, fixing the rotational position by introducing the guide pin in the hole of the counterpart.

Thus, the position of the part of the wind turbine can stepwise be aligned in respect to the counterpart.

First, the part and the counterpart can be aligned in respect to directions perpendicular to the main direction of approach.

Then, the rotational position of the part of the wind turbine can be aligned to the counterpart.

The alignment can be performed, with the arrangement as described, in an automated or remote controlled manner, without workers assisting in the hazardous area in the vicinity of the part of the wind turbine or the counterpart.

Thus, the installation of parts of the wind turbine is saver for the personnel performing the installation.

BRIEF DESCRIPTION

Some of the embodiments will be described in detail, with reference to the following figures, wherein like designations denote like members, wherein.

DETAILED DESCRIPTION

Figure 1:
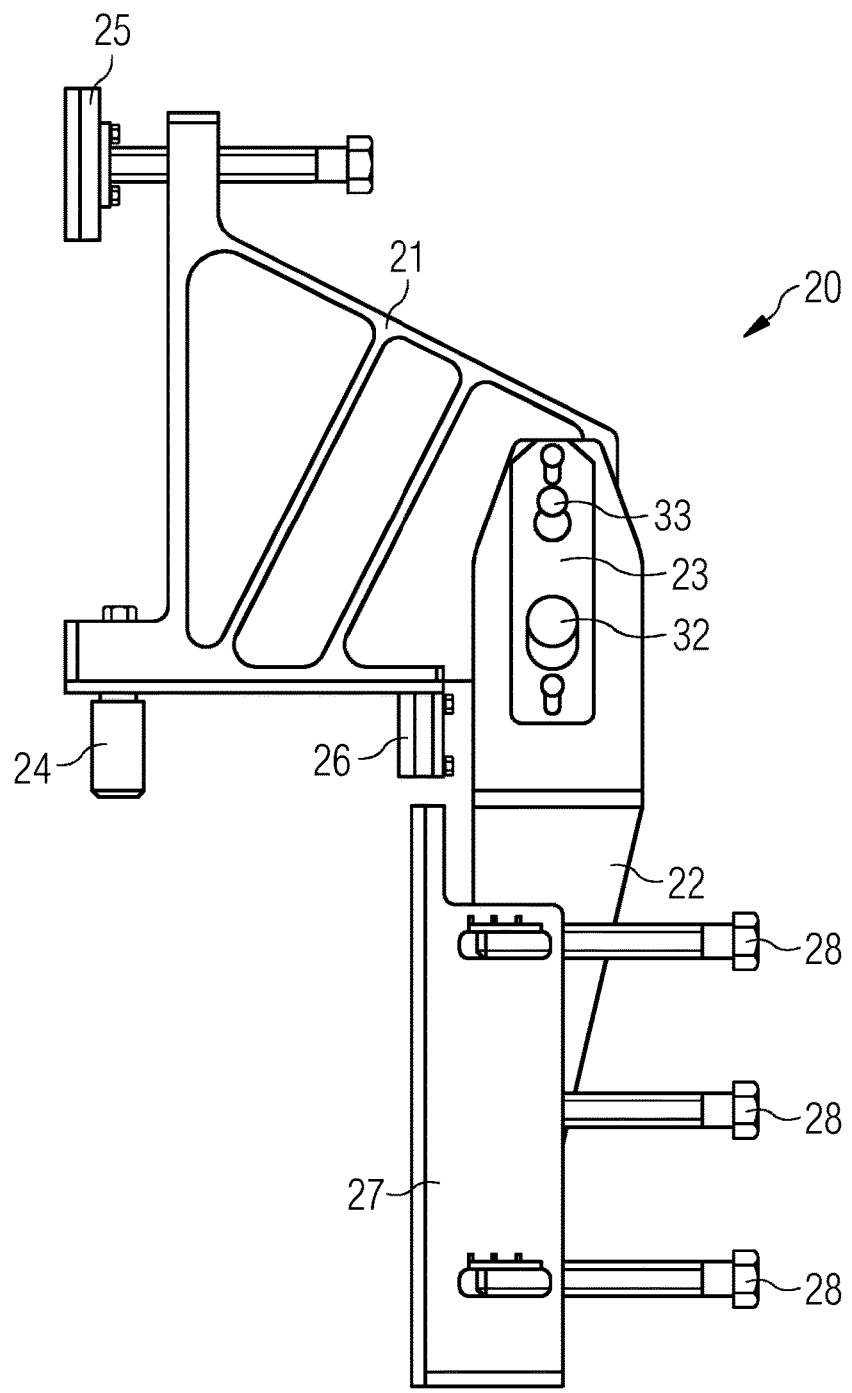
FIG. 1 shows an embodiment of an alignment tool.

FIG. 1 shows an alignment tool 20 to align a part of a wind turbine to its counterpart.

The alignment tool comprises a base 21 and an arm 22. The arm 22 is connected to the base 21 by a connection pin 32 and a shear pin 33. A connection pin 32 and a shear pin 33 are secured by a locking mechanism 23.

An alignment plate 27 is attached to the arm 22. The position of the alignment plate 27 in respect to the arm 22 can be adjusted by adjustment screws 28.

The base 21 of the alignment tool is connected to a part of a wind turbine by a flange pin 24.

In addition, a wall clamp 25 and a flange clamp 26 are provided.

The alignment tool 20 can be attached to a flange, for example, of a wind turbine tower. The flange pin 24 is then arranged in a hole of the flange of the wind turbine tower. In addition, the flange clamp 26 is adjusted to clamp the alignment tool 20 to the flange of the wind turbine tower.

In addition, the wall clamp 25 is adjusted to act on the wall of the wind turbine tower.

During the alignment of the part of the wind turbine with its counterpart the surface of the alignment plate 27 abuts on the counterpart of the part of the wind turbine. Thus, a force acts on the surface of the alignment plate 27.

When the force acting on the surface of the alignment plate 27 exceeds a certain limit the shear pin 33 breaks. Thus, the arm of the alignment tool 22 can pivot around the connection pin 32 in respect to the base 21 of the alignment tool 20.

Figure 2:
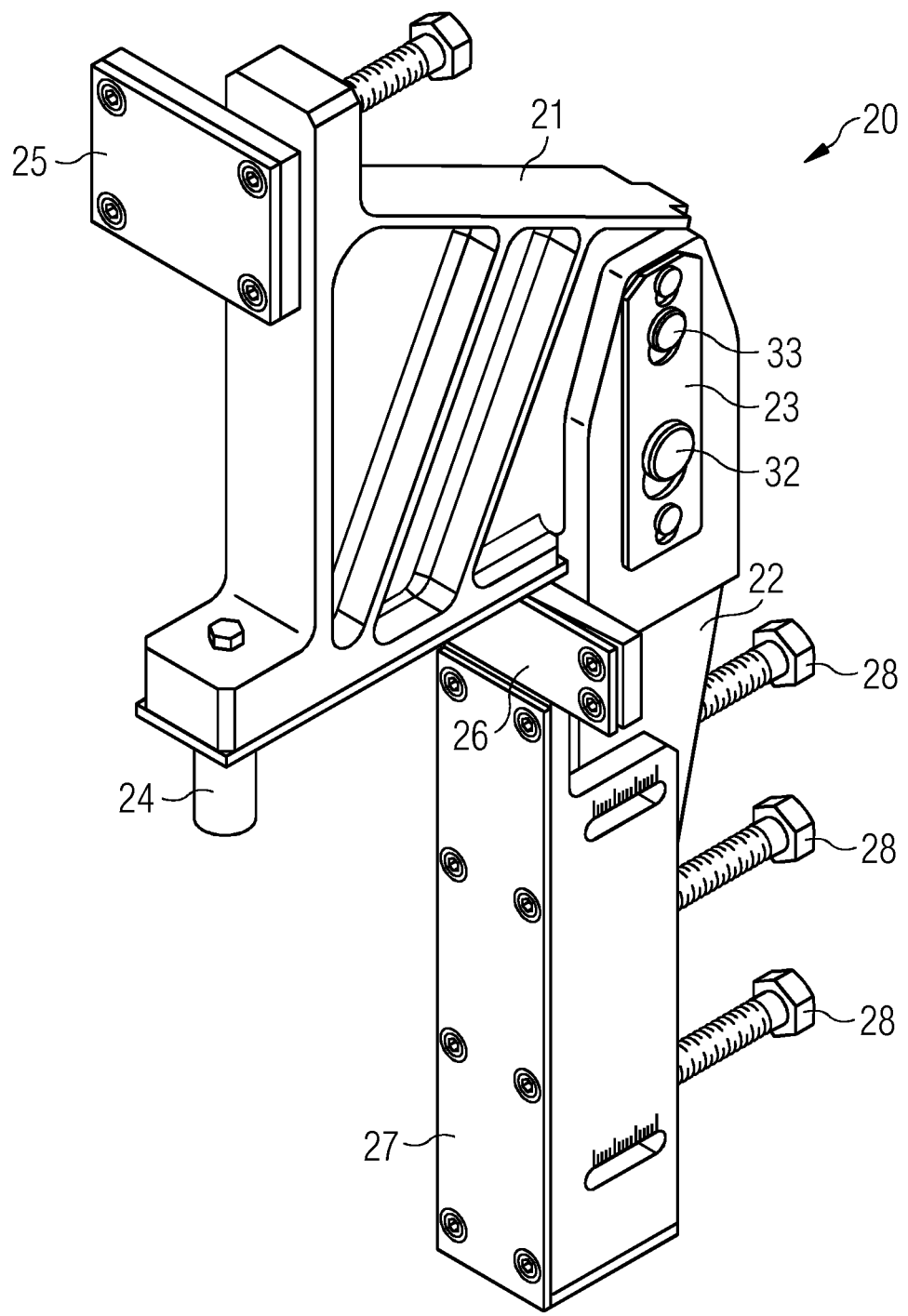
FIG. 2 shows a second view of an embodiment of the alignment tool.

FIG. 2 shows a second view of the alignment tool 20. The alignment tool 20 comprises a base 21 and an arm 22.

The arm 22 of the alignment tool 20 is attached to the base 21 by a connection pin 32. In addition a shear pin 33 is used to connect the arm 22 of the alignment tool to the base 21.

The base 21 of the alignment tool 20 comprises a flange pin 24, a wall clamp 25 and a flange clamp 26 to attach the alignment tool 20 to a part of a wind turbine.

To attach the alignment tool 20 to a part of the wind turbine the flange pin 24 is introduced into a hole at a flange of the part of the wind turbine, for example. In addition, the flange clamp 26 and the wall clamp 25 are tightened to act on the part of the wind turbine.

The arm 22 of the alignment tool 20 comprises an alignment plate 27 that can be adjusted with adjustment screws 28.

During the alignment of a part of the wind turbine to its counterpart the surface of the alignment plate 27 abuts on the counterpart of the part of the wind turbine. The surface of the alignment plate 27 that abuts on the counterpart faces in the direction of the flange pin 24.

The surface of the alignment plate 27 can be equipped with a soft material to avoid damages at the counterpart of the part of the wind turbine during the alignment.

The connection pin 32 and the shear pin 33 are fixed in their position by a locking mechanism 23.

Figure 3:
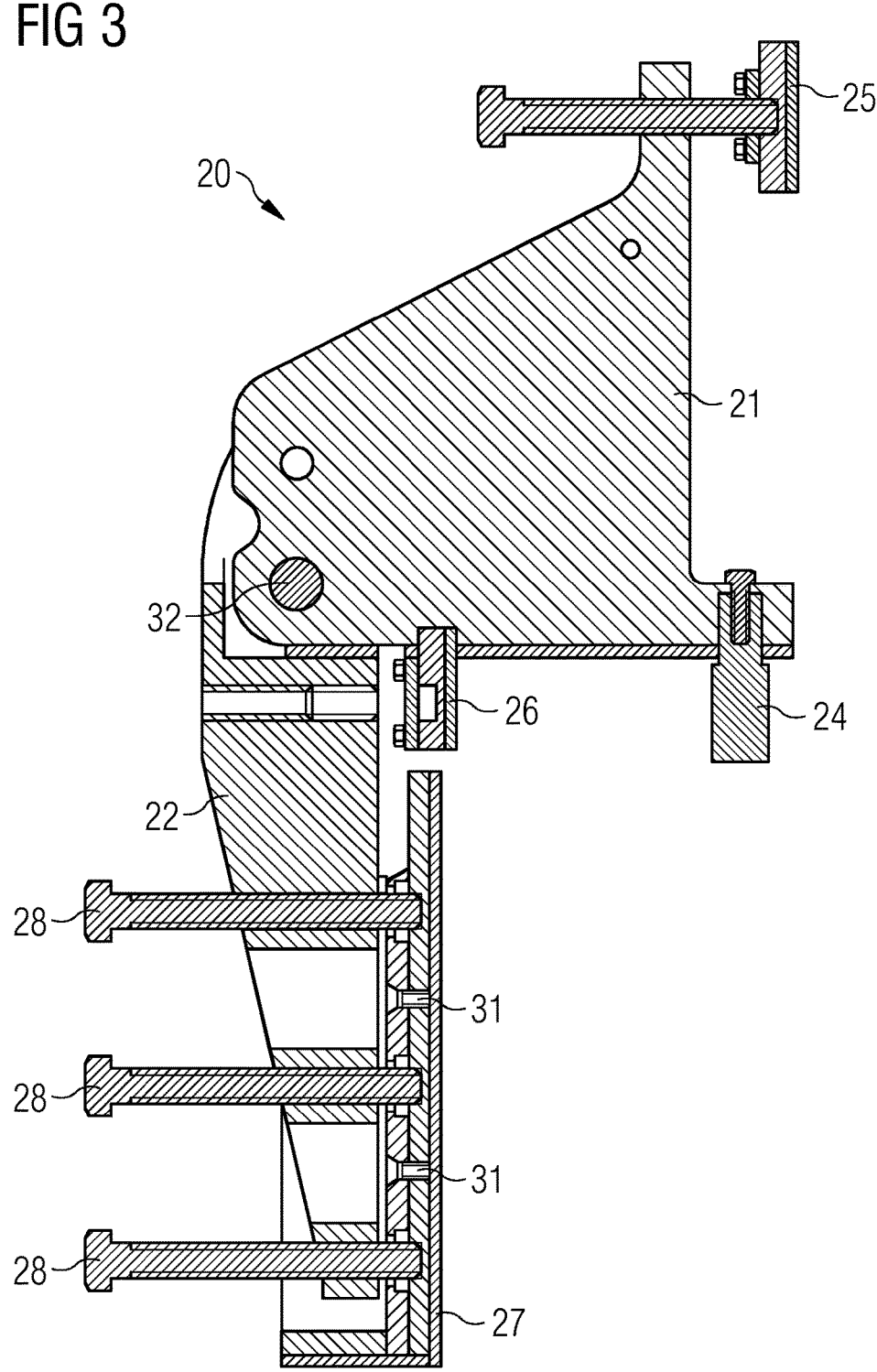
FIG. 3 shows a cut through view of an embodiment of the alignment tool.

FIG. 3 shows a cut through the alignment tool 20. The alignment tool 20 comprises a base 21 and an arm 22. The base 21 comprises a flange pin 24, a wall clamp 25 and a flange clamp 26.

When the alignment tool 20 is connected to a part of the wind turbine the flange pin 24 is introduced in the hole of a flange of the part of the wind turbine. A flange clamp 26 acts on the flange of the part of the wind turbine to secure the position of the alignment tool 20 in respect to the part of the wind turbine.

In addition, the wall clamp 25 acts on the wall of the part of the wind turbine to secure the position of the alignment tool 20.

The arm 22 of the alignment tool 20 comprises an alignment plate 27. A position of the alignment plate 27 in respect to the alignment tool 20 can be adjusted by adjustment screws 28.

The alignment plate 27 is connected to the arm 22 by connection screws 31. The arm 22 of the alignment tool 20 is connected to the base 21 by a connection pin 32.

Figure 4:
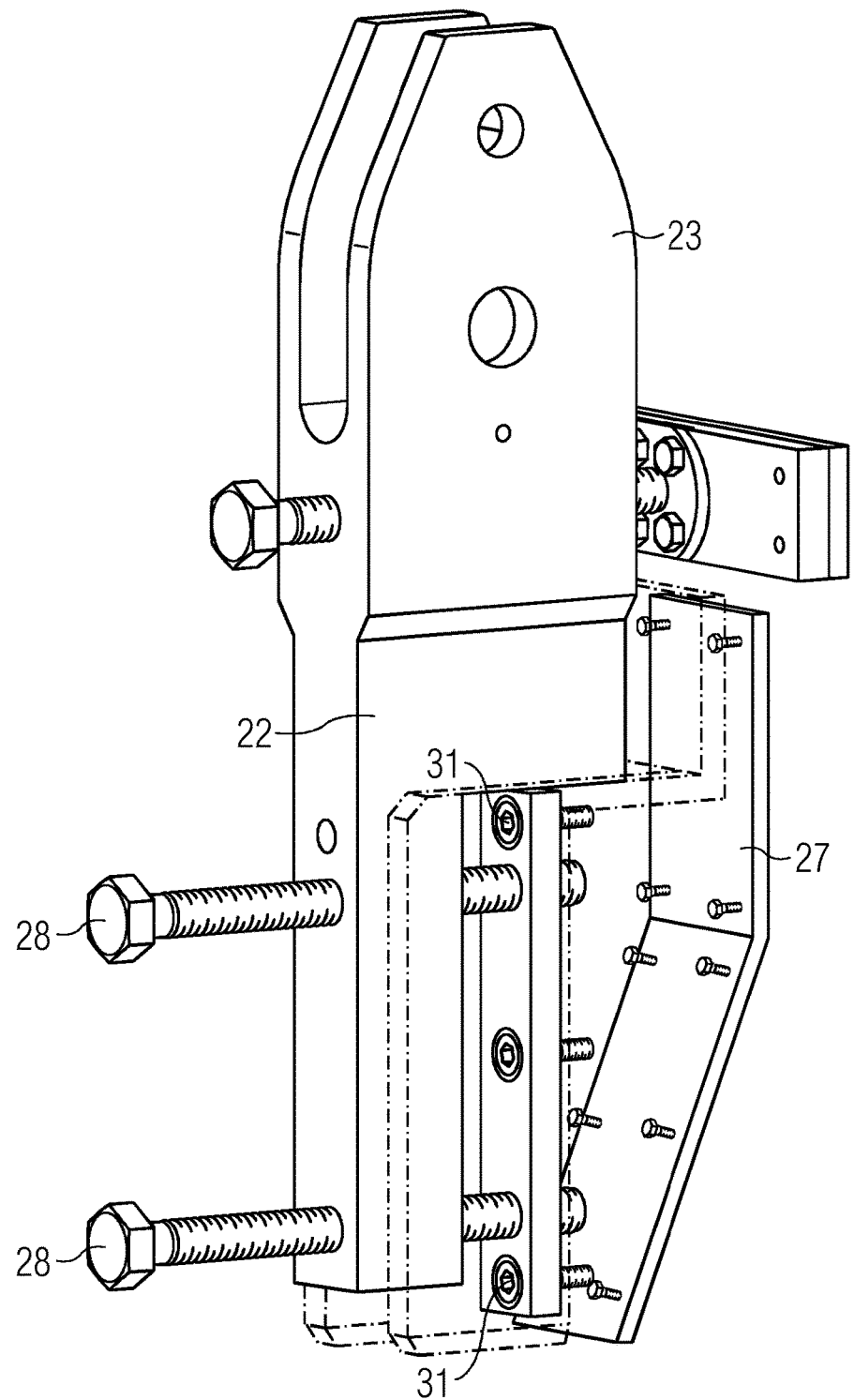
FIG. 4 shows a second embodiment of an arm of the alignment tool.

FIG. 4 shows a second embodiment of an arm 22 of an alignment tool. The arm 22 of the alignment tool comprises an alignment plate 27 that can be adjusted in its position in respect to the arm 22 by adjustment screws 28.

The adjustment screws 28 are connected to an adjustment plate and the alignment plate 27 is connected to the adjustment plate by connection screws 31.

The surface of the alignment plate 27 that points away from the adjustment screws 28 is equipped with a soft surface.

This area of the surface of the alignment plate 27 abuts on the counterpart of the part of the wind turbine during the alignment of the part of the wind turbine.

In addition, the surface of the alignment plate 27 shows a tapered section to facilitate the alignment of the part of the wind turbine and its counterpart.

Figure 5:
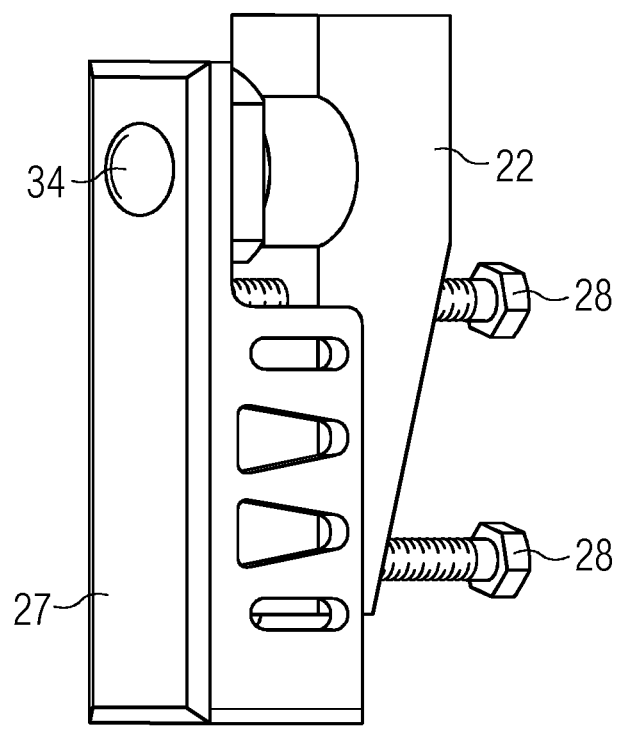
FIG. 5 shows another embodiment of the arm.

FIG. 5 shows another embodiment of the arm 22 of the alignment tool. The arm 22 of the alignment tool comprises an alignment plate 27. The position of the alignment plate 27 in respect to the arm 22 can be adjusted by adjustment screws 28.

The surface of the alignment plate 27, that points away from the adjustment screws 28, abuts on the counterpart of the part of the wind turbine during the alignment.

This surface of the alignment plate 27 comprises ball elements 34 which also abut on the counterpart of the part of the wind turbine.

While the arm 22 of the alignment tool abuts on the counterpart of the part of the wind turbine it acts as an arrester to stop and/or hinder a movement of the part of the wind turbine relative to the counterpart in one direction.

Thus, it is still possible to adjust the position of the part of the wind turbine in respect to the counterpart in a direction perpendicular to the first direction.

During this adjustment the ball element 34 rolls along the surface of the counterpart of the part of the wind turbine.

Thus, the ball element 34 facilitates the adjustment process of the part of the wind turbine.

Figure 6:
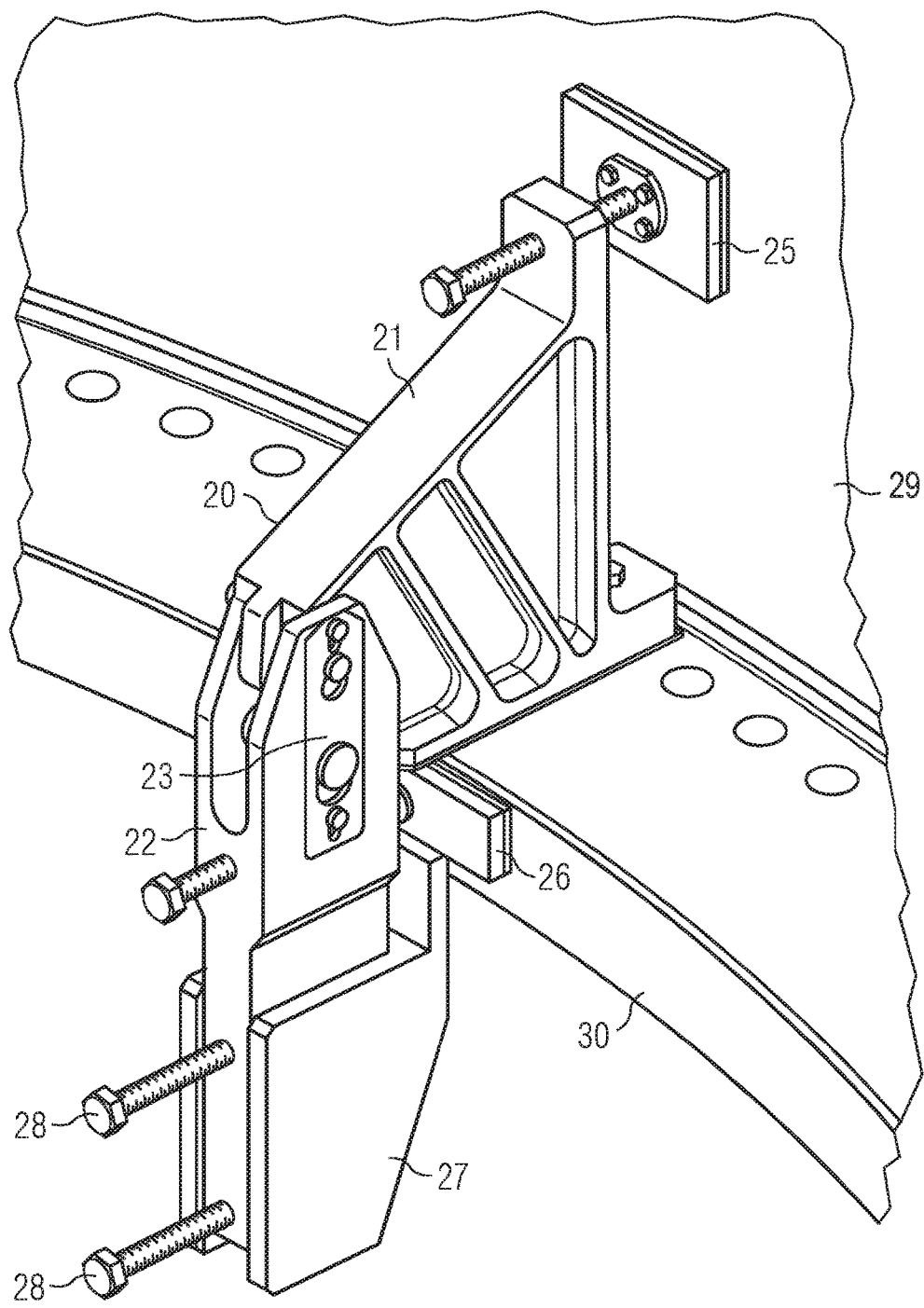
FIG. 6 shows an embodiment of an alignment situation of the alignment tool.

FIG. 6 shows an alignment situation of the alignment tool 20 at a part of the wind turbine. The part of the wind turbine comprises a wall 29 and a flange 30. The flange 30 comprises a plurality of holes that are later used to connect the part of the wind turbine to its counterpart with bolts.

The alignment tool 20 comprises a base 21 that is arranged at a flange 30 of the part of the wind turbine. The position of the base 21 of the alignment tool 20 at the flange 30 of the part of the wind turbine is secured by a flange clamp 26 and a wall clamp 25.

The alignment tool 20 comprises an arm 22. The arm 22 comprises an alignment plate 27. The position of the alignment plate 27 in respect to the arm 22 can be adjusted by adjustment screws 28.

The arm 22 of the alignment tool 20 is connected to the base 21 by a connection pin and a shear pin that are secured in their position by a locking mechanism 23.

The alignment tool 20 is connected to the part of the wind turbine and projects or protrudes over the physical dimensions of the part of the wind turbine.

During the installation of the part of the wind turbine the part of the wind turbine needs to be aligned to its counterpart.

The part of the wind turbine is brought closer to the counterpart and the surface of the alignment plate 27 at the arm 22 of the alignment tool 20 abuts on the counterpart of the part of the wind turbine.

Thus, a relative movement between the part of the wind turbine and its counterpart in one direction is hindered and/or stopped by the alignment tool 20.

Thus, the alignment tool 20 acts as an arrestor or stopper to stop a movement in one lateral direction.

Figure 7:
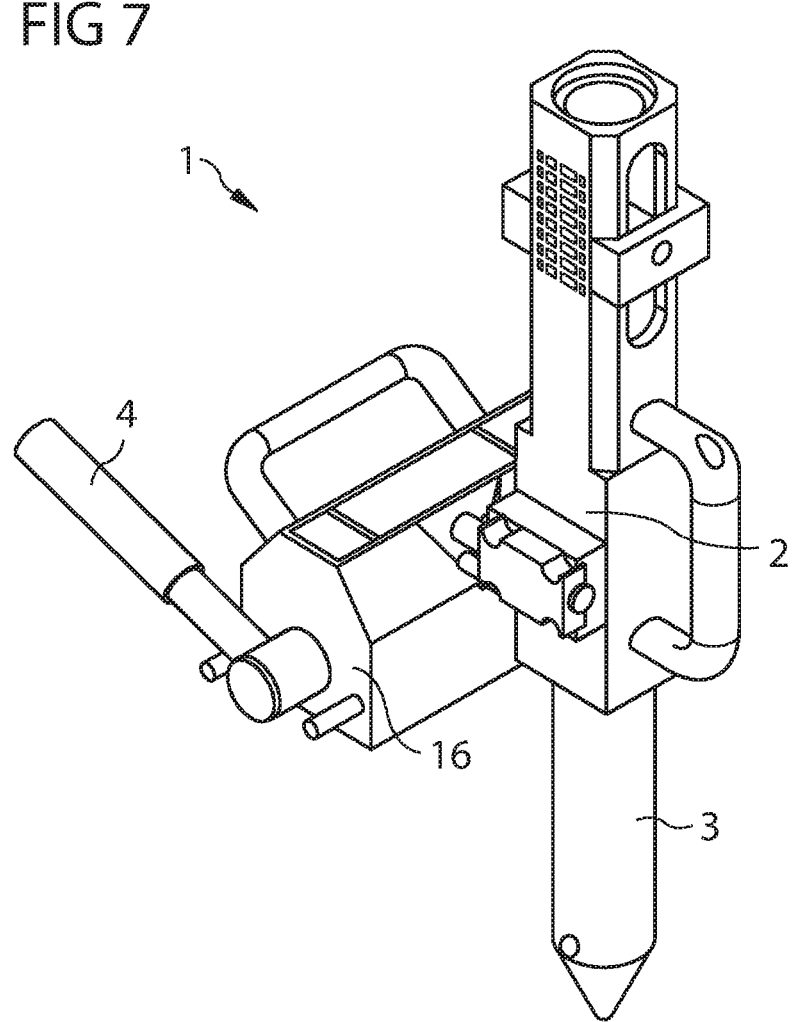
FIG. 7 shows an embodiment of a guide pin unit.

FIG. 7 shows a guide pin unit 1. The guide pin unit 1 comprises a shaft 2, and the shaft 2 comprises the guide pin 3.

The guide pin 3 comprises a longitudinal axis, and a position of the guide pin 3 in respect to the guide pin unit 1 can be adjusted along the longitudinal axis of the guide pin 3 within the shaft 2.

A guide pin unit 1 comprises a magnet mounting 16 to attach the guide pin unit 1 to a part of a wind turbine. The magnet mounting 16 is activated by a handle 4.

The part of the wind turbine can be a tower, for example, that comprises a flange. The flange comprises holes and the guide pin unit 1 is attached to the flange in a way that the guide pin 3 reaches through one of the holes in the flange.

Figure 8:
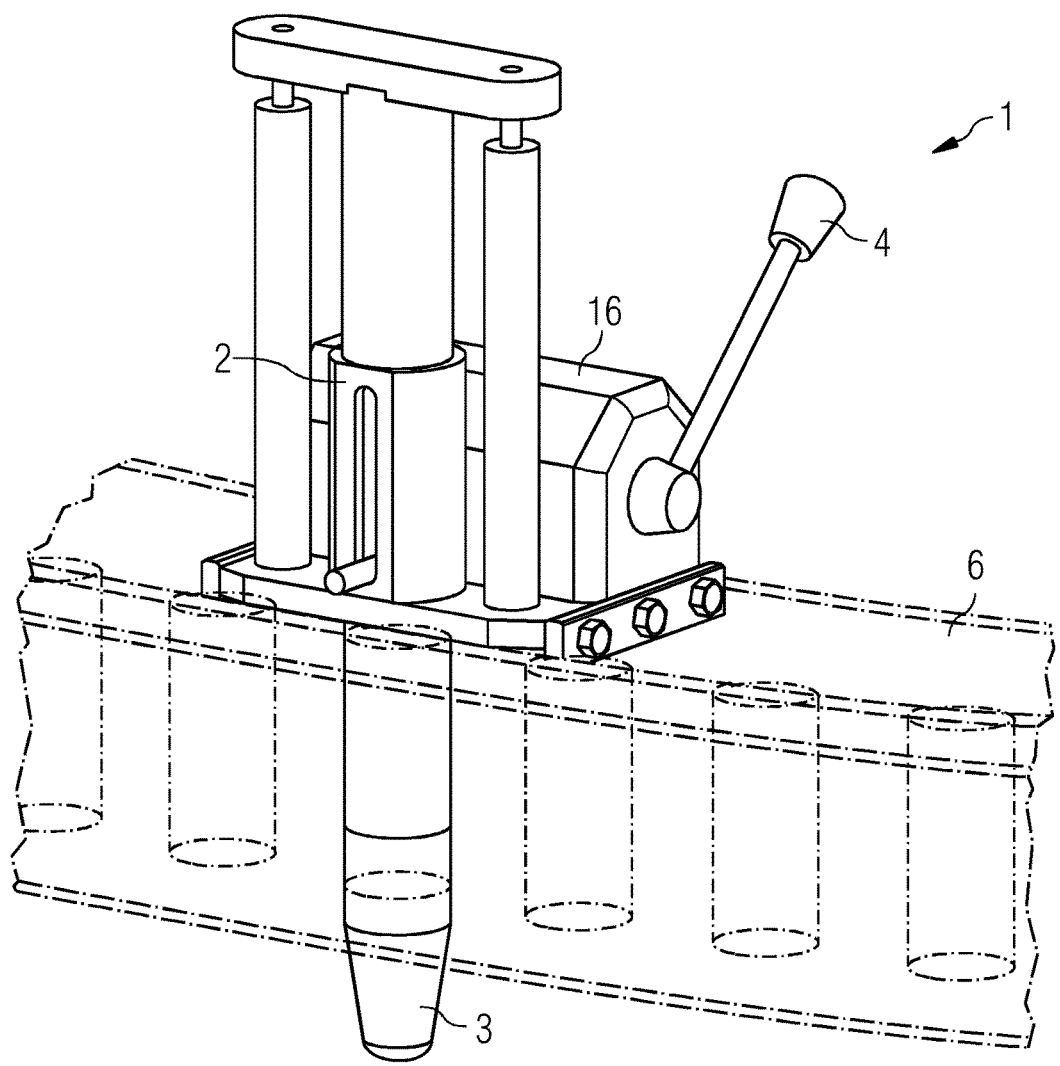
FIG. 8 shows an embodiment of an installation situation of a guide pin unit.

FIG. 8 shows an installation situation of a guide pin unit 1. The guide pin unit 1 comprises a shaft 2, and the shaft 2 comprises the guide pin 3.

The guide pin unit 1 is attached to a flange 6 of a part of a wind turbine in a way that a guide pin 3 reaches through one of the holes of the flanges 6.

The guide pin unit 1 is attached to the flange 6 by a magnet mounting 16. The magnet mounting 16 is activated by a handle 4.

The position of the guide pin 3 in the shaft 2 can be adjusted in a way that the guide pin 3 reaches into the hole at the flange 6 or through the hole of the flange 6.

In the installation situation in FIG. 8 the guide pin 3 reaches all the way to the hole of the flange 6 and protrudes over the physical dimensions of the part of the wind turbine.

Thus, the guide pin 3 can interact with a hole of a flange of a counterpart of the part of the wind turbine to align the position of a hole in a flange of a counterpart to the part of the wind turbine.

Figure 9:
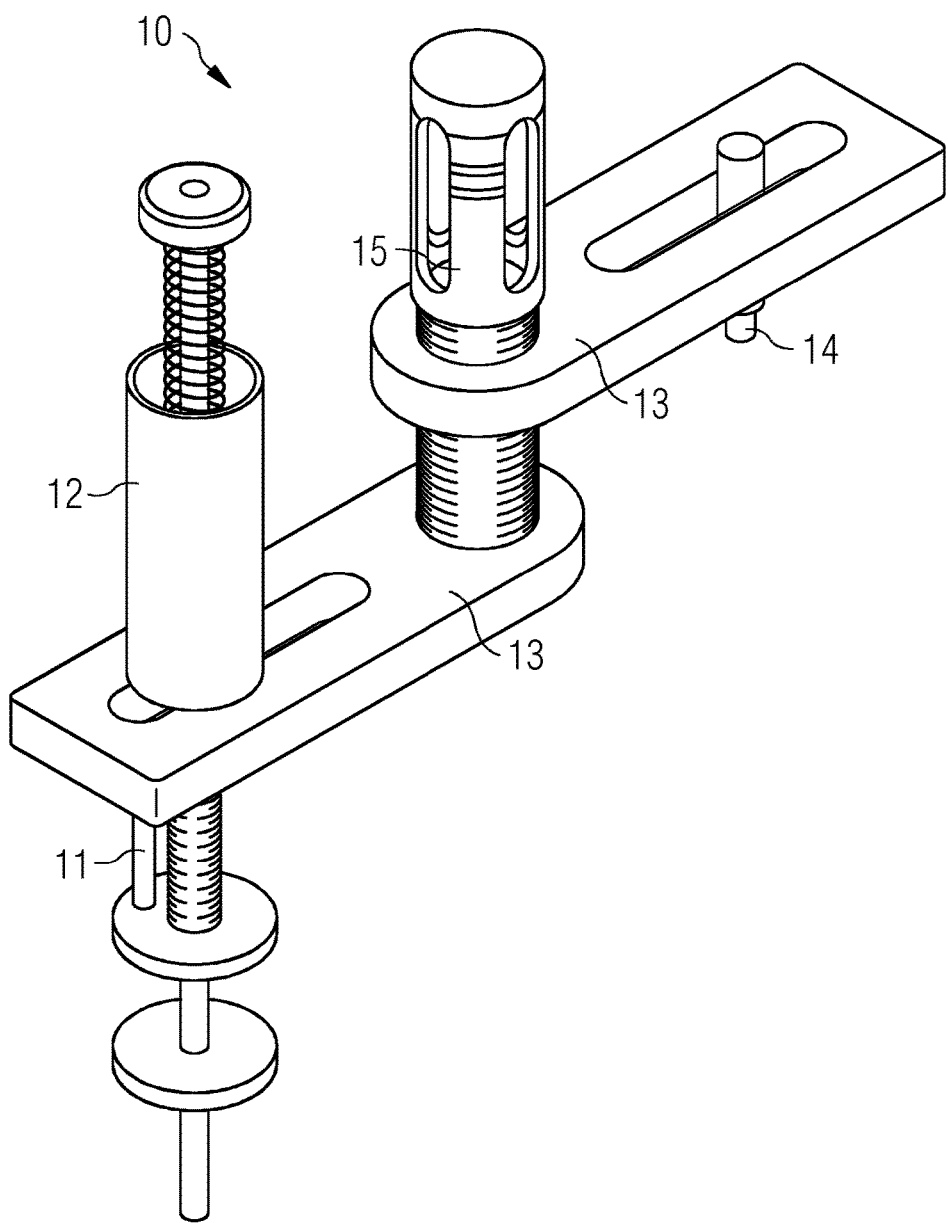
FIG. 9 shows an embodiment of a sensor unit.

FIG. 9 shows a sensor unit 10 that is used to detect the position of a guide pin of a guide pin unit.

The sensor unit 10 is connected to a counterpart of a part of a wind turbine. The sensor unit 10 comprises a mounting pin 15 that is arranged in the hole of a flange of a counterpart.

The sensor unit 10 comprises assembly plates 13 that connect the sensors to the mounting pin 15.

The sensor unit 10 comprises a hole sensor 14 to detect the presence of a hole of a flange of a part of a wind turbine over the hole sensor 14.

The sensor unit 10 comprises a guide pin sensor 11. The guide pin sensor 11 is activated by a piston that is arranged in a shaft 12 and loaded with a spring.

When the guide pin of the guide pin unit is introduced into a hole of the flange of the counterpart of the wind turbine the guide pin interacts with the piston in the shaft 12 of the sensor unit 10. The piston in the shaft 12 is pushed downwards and activates the guide pin sensor 11.

Thus, the guide pin sensor 11 detects the presence of a guide pin in the hole of the counterpart of the wind turbine. The hole sensor 14 of the sensor unit 10 is in this embodiment an optical sensor that interacts with the reflective plate.

The optical sensor sends a signal that is reflected by the reflective plate and is then detected by the optical sensor.

Figure 10:
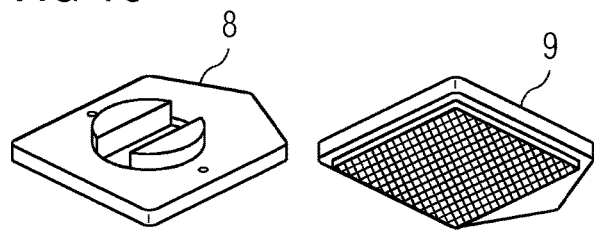
FIG. 10 shows an embodiment of a reflective plate.

FIG. 10 shows the reflective plate 8. The reflective plate 8 comprises a reflective area 9 to interact with the optical sensor of the sensor unit. The reflective plate 8 is attached to a hole of the flange of a part of the wind turbine.

Thus the light of the optical sensor travels from the sensor through the hole in the flange of the counterpart, through the hole of the flange of the part of the wind turbine to the reflective plate. The optical signal is then reflected and travels back through the hole of the part of the wind turbine and the hole of the counterpart to be received by the optical sensor at the sensor unit.

Figure 11:
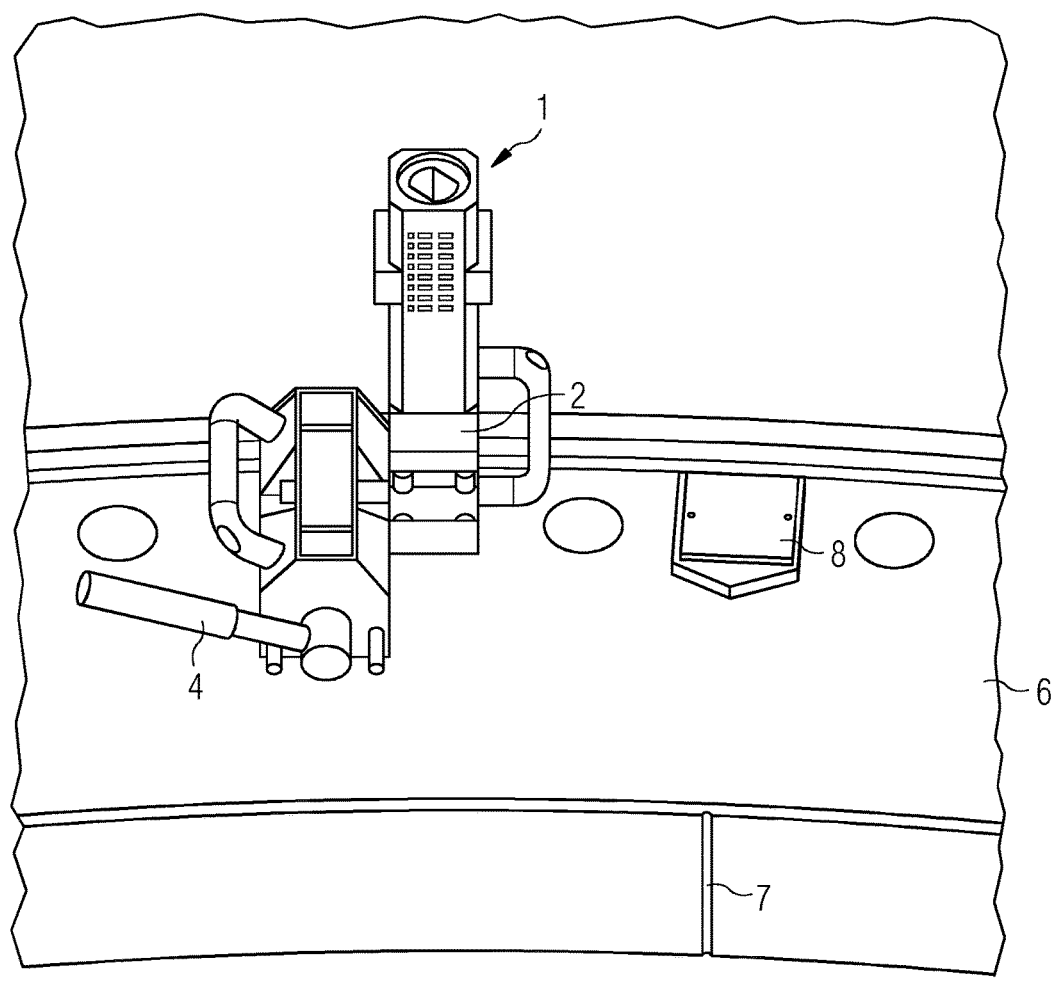
FIG. 11 shows an embodiment of an installation situation of the guide pin unit and a reflective plate.

FIG. 11 shows an installation situation of the guide pin unit 1 in the reflective plate 8.

The guide pin unit 1 comprises a shaft 2 and the shaft 2 comprises the guide pin. The guide pin unit 1 is attached to the flange 6 by a magnet mounting 16 that is activated by handle 4.

The pin of the guide pin unit reaches into a hole in the flange 6 of the part of the wind turbine.

The reflective plate 8 is attached to the flange of the wind turbine right above a hole of the flange 6. The reflective area of the reflective plate is pointing downwards and is visible through the hole of the flange 6. The flange 6 of the part of the wind turbine comprises an assembly mark 7 for an visual control of the alignment situation of the part of the wind turbine in respect to the counterpart.

The hole sensor of the sensor unit comprises an optical sensor that sends light through a hole of the flange of the counterpart, to detect the position of the reflective plate at the hole of the flange of the part of the wind turbine.

When the hole of the part of the wind turbine that is equipped with the reflective plate 8, is aligned to the hole of the counterpart that is assigned to the optical sensor 14 the light that is sent out by the optical sensor of the sensor unit is reflected by the reflective area of the reflective plate and is detected again by the optical sensor of the sensor unit.

Thus, it can be detected via the optical sensor that the two respective holes are aligned. And thus the part of the wind turbine is in the predetermined rotational position in respect to the counterpart.

The part of the wind turbine can then be brought closer to its counterpart so that the guide pin of the guide pin unit is introduced into the hole of the counterpart of the part of the wind turbine.

The presence of the pin in the hole of the counterpart is then detected by the guide pin sensor of the sensor unit.

Figure 12:
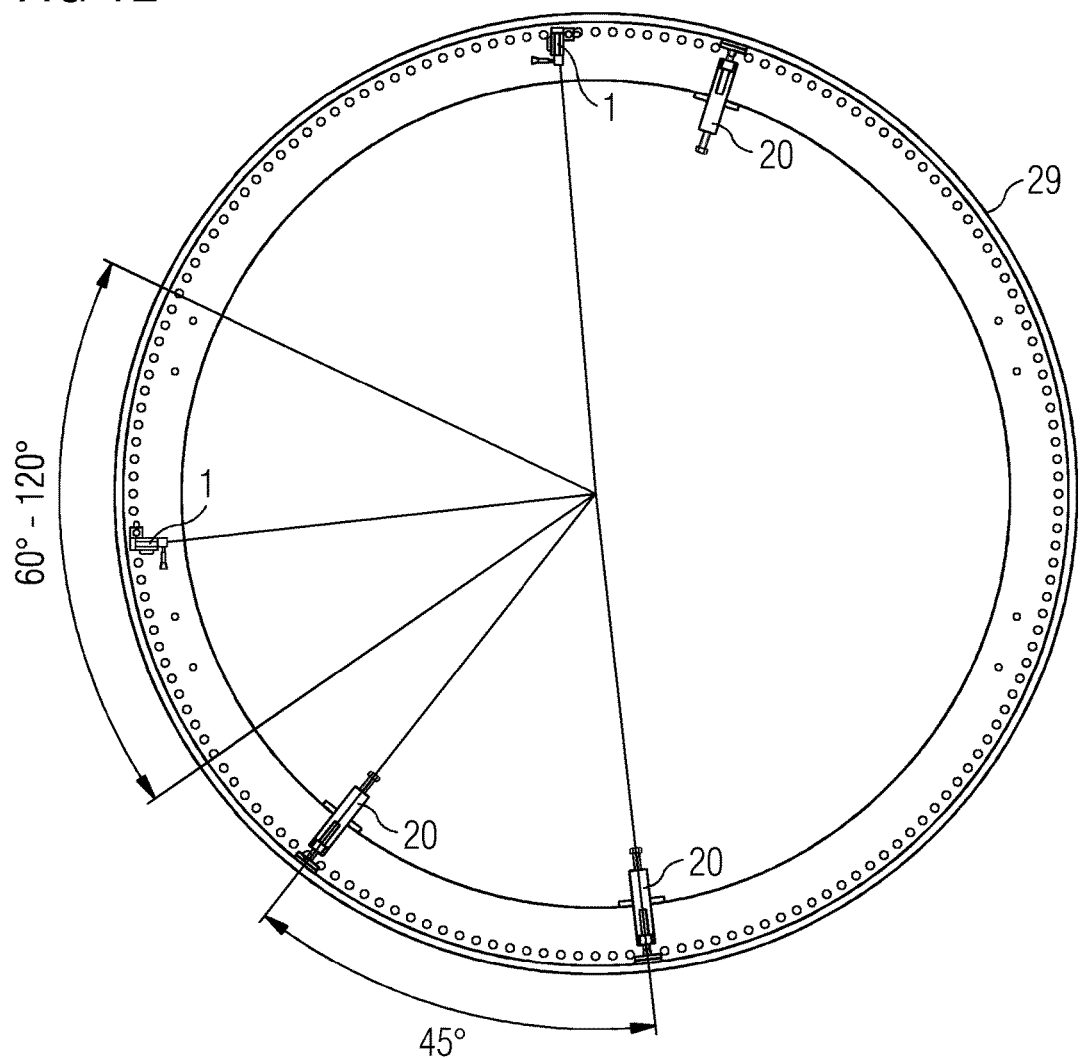
FIG. 12 shows an embodiment of the alignment arrangement as arranged at the part of the wind turbine.

FIG. 12 shows the arrangement to align a part of a wind turbine to its counterpart.

The arrangement comprises three alignment tools 20.

In addition the arrangement comprises two guide pin units 1.

The alignment tools 20 and the guide pin units 1 are arranged at a flange of a wall 29 of a part of a wind turbine.

The flange that is connected to the wall of the part of the wind turbine is a circular flange. Two of the alignment tools 20 are spaced in an angle of around 45 degrees along the flange of the part of the wind turbine.

The third alignment tool 20 is positioned on the opposite side of the flange, spaced in an angle of approximately 180 degree to the group of the first two alignment tools.

The first guide pin unit is spaced in an angle of 45 to 90 degrees from the first alignment tools. The second guide pin unit 1 is spaced in an angle of mainly 90 degrees of the first guide pin unit 1.

The alignment tools 20 and the guide pin units 1 are connected to and interact with holes in the flange of the part of the wind turbine.

During the installation of a part of the wind turbine with its counterpart the part of the wind turbine needs to be aligned with the counterpart.

The part of the wind turbine is brought close to the counterpart. The alignment tools 20 protrude over the physical dimensions of the part of the wind turbine. Thus, the alignment tools can abut on the counterpart of the part of the wind turbine before the part of the wind turbine comes in contact to the counterpart.

The alignment tools 20 are of different length. Thus, the first two of the alignment tools 20 that are spaced in an angle of around 45 degrees apart from each other, have a longer arm and thus abut on the counterpart of the part of the wind turbine before the third alignment tool 20 that is spaced on the opposite side of the flange.

Once the alignment tools 20 are in contact with the counterpart and thus abut on the wall of the counterpart, a rotational movement of the part of the wind turbine in respect to the counterpart is still possible.

Thus, the part of the wind turbine can be rotated in respect to the counterpart until the optical sensor of the sensor unit detects that a respective hole of the part of the wind turbine is aligned with the hole of the counterpart of the wind turbine.

The rotational movement of the part of the wind turbine is then stopped and the part of the wind turbine is lowered until the guide pin of the guide pin unit is introduced in its respective hole of the counterpart of the wind turbine. It is there detected by the guide pin sensor of the sensor unit of the counterpart.

Thus, the alignment of the part of the wind turbine to its counterpart can be performed without workers acting on the part of the wind turbine. Also the presence of workers at the connection side to control the alignment visually is not necessary.

The illustration in the drawings is in schematic form. It is noted that in different figures, similar or identical elements are provided with the same reference signs.

Although embodiments of the present invention have been described in detail with reference to the preferred embodiment, it is to be understood that embodiments of the present invention is not limited by the disclosed examples, and that numerous additional modifications and variations could be made thereto by a person skilled in the art without departing from the scope of embodiments of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. An arrangement to align a part of a wind turbine to a counterpart, whereby the part of the wind turbine and the counterpart are approached in a main direction of approach, to be connected, the arrangement comprising:
 a first alignment tool and a second alignment tool, each of the first alignment tool and the second alignment tool including a first area to be connected to the part of the wind, and a second area that protrudes over the physical dimensions of the part of the wind turbine mainly in the main direction of approach, wherein the second area is arranged and prepared in a way to abut on the counterpart, in a direction perpendicular to the main direction of approach, as an arrester to stop and/or hinder a movement of the part of the wind turbine with respect to the counterpart during the alignment;
 wherein the first alignment tool stops and/or hinders a movement in a first direction, so that a position of the part of the wind turbine with respect to the counterpart is fixed in a first direction;
 wherein the second alignment tool stops and/or hinders a movement in a second direction, so that the position of the part of the wind turbine with respect to the counterpart is fixed in a second direction;
 wherein the arrangement comprises at least one guide pin unit, that interacts with a hole in the counterpart, to arrest a rotational position of the part of the wind turbine with respect to the counterpart, after the rotational position of the part of the wind turbine was aligned to the counterpart;
 wherein the first alignment tool and the second alignment tool each are connected to the part of the wind turbine by a pin that is introduced in a hole of the part of the wind turbine.

2. The arrangement according to claim 1, wherein the second area of the first alignment tool and the second alignment tool comprises an elastic part to avoid a damage of the counterpart when the second area abuts on the counterpart.

3. The arrangement according to claim 1, wherein the first alignment tool and second alignment tool each comprises a base and an arm, and that the base comprises the first area and the arm comprises the second area.

4. The arrangement according to claim 3, wherein the arm is connected to the base by a connection that withstands forces that act on the arm up to a certain predetermined value, and allows the arm to yield, when the predetermined force is exceeded.

5. The arrangement according to claim 1, wherein the second area of the alignment tool comprises a section that is inclined with respect to the main direction of approach to facilitate the alignment of the part of the wind turbine with respect to the counterpart.

6. The arrangement according to claim 5, wherein at least one of the first alignment tool and the second alignment tool and/or the at least one guide pin unit is detachably attached to the part of the wind turbine.

7. The arrangement according to claim 1, wherein the first alignment tool projects further over the physical dimensions of the part of the wind turbine than the second alignment tool, so that the first alignment tool abuts on the counterpart before the second alignment tool, when the part of the wind turbine is approached to the counterpart.

8. The arrangement according to claim 1, wherein the at least one guide pin unit comprises a guide pin, and the guide pin comprises a longitudinal axis that is mainly parallel to the main direction of approach, and that the guide pin yields in the direction of the longitudinal axis, and is rigid in a direction perpendicular to the longitudinal axis.

9. The arrangement according to claim 1, wherein the first alignment tool and the second alignment tool each are connected to a flange of the part of the wind turbine by the pin that is introduced in the hole of the flange and a clamp acting on the part of the wind turbine.

10. The arrangement according to claim 1, wherein the second area of the first alignment tool and second alignment tool comprises a spherical element that abuts on the counterpart so that the second area of the first alignment tool and second alignment tool rolls along the surface of the counterpart during a movement of the part of the wind turbine with respect to the counterpart to facilitate the movement and avoid a damage at the counterpart.

11. The arrangement according to claim 1, wherein a sensor unit is arranged at the counterpart to detect a presence of a guide pin of the at least one guide pin unit in a hole of the counterpart.

12. The arrangement according to claim 1, wherein an optical sensor is arranged at the counterpart to trace the rotational position of the part of the wind turbine with respect to the counterpart.

13. The arrangement according to claim 12, wherein the optical sensor comprises an optical transmitter and an optical receiver to send and receive optical information.

14. The arrangement according to claim 12, wherein a reflective element is attached to the part of the wind turbine to interact with the optical sensor that is attached to the counterpart, and to facilitate the tracing of the rotational position of the part of the wind turbine.

15. The arrangement according to claim 1, wherein the at least one guide pin is connected to the part of the wind turbine at a different location along a flange of the part of the wind turbine than the first alignment tool and the second alignment tool.

16. A method to align a part of a wind turbine to a counterpart by using an arrangement, the part of the wind turbine and the counterpart are approached in a main direction of approach, to be connected, the arrangement comprising a first alignment tool and a second alignment tool, the first alignment tool and the second alignment tool each comprise a first area to be connected to the part of the wind turbine, and a second area that protrudes over the physical dimensions of the part of the wind turbine mainly in the main direction of approach, wherein the second area is arranged and prepared in a way to abut on the counterpart, in a direction perpendicular to the main direction of approach, as an arrester to stop and/or hinder a movement of the part of the wind turbine with respect to the counterpart during the alignment, the first alignment tool stops and/or hinders a movement in a first direction so that the position of the part of the wind turbine with respect to the counterpart is fixed in a first direction, and the second alignment tool stops and/or hinders a movement in a second direction so that the position of the part of the wind turbine with respect to the counterpart is fixed in a second direction, further wherein the arrangement comprises at least one guide pin unit that interacts with a hole in the counterpart, to arrest the rotational position of the part of the wind turbine with respect to the counterpart, after the rotational position of the part of the wind turbine was aligned to the counterpart, wherein the first alignment tool and the second alignment tool each are connected to the part of the wind turbine by a pin that is introduced in a hole of the part of the wind turbine, the method comprising:

abutting the first alignment tool to the counterpart by performing a lateral movement in a first direction;

abutting the second alignment tool to the counterpart by performing a lateral movement in a second direction;

rotating the part of the wind turbine with respect to the counterpart to reach a predetermined rotational position; and fixing the rotational position by introducing a guide pin in the hole of the counterpart.

* * * * *